(12) United States Patent
Epitaux et al.

(10) Patent No.: US 7,680,417 B2
(45) Date of Patent: Mar. 16, 2010

(54) BI-DIRECTIONAL PARALLEL OPTICAL LINK

(75) Inventors: Marc Epitaux, Sunnyvale, CA (US); Jean-Marc Verdiell, Palo Alto, CA (US); Peter Kirkpatrick, San Francisco, CA (US); Jan P. Peeters Weem, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 11/321,364

(22) Filed: Dec. 28, 2005

(65) Prior Publication Data

US 2007/0147845 A1    Jun. 28, 2007

(51) Int. Cl.
  *H04B 10/00* (2006.01)
(52) U.S. Cl. .................................. 398/139; 398/164
(58) Field of Classification Search ................. 398/128, 398/135, 138, 139, 164, 175, 176
  See application file for complete search history.

(56) References Cited

U.S. PATENT DOCUMENTS 5,487,120 A * 1/1996 Choy et al. ................... 385/24
6,398,425 B2 * 6/2002 Williams et al. ............... 385/89
7,295,783 B2 * 11/2007 Singh et al. .................. 398/175
2002/0003640 A1 * 1/2002 Trezza ......................... 359/120
2004/0175077 A1   9/2004 Weber
2004/0207926 A1 * 10/2004 Buckman et al. ............. 359/642
2005/0058389 A1 * 3/2005 Ouchi .......................... 385/14
2007/0147846 A1 * 6/2007 Epitaux et al. ............... 398/141

OTHER PUBLICATIONS

PCT International Search Report (dated May 7, 2007), International Application No. PCT/US2006/047651—International Filing Date Dec. 12, 2006 [11 pages].
Non-Final Office Action (dated Aug. 17, 2009), U.S. Appl. No. 11/634,743, filed Dec. 5, 2006, First Named Inventor: Marc Epitaux, (18 pages).

* cited by examiner

*Primary Examiner*—Dalzid Singh
(74) *Attorney, Agent, or Firm*—Blakely, Sokoloff, Taylor & Zafman LLP

(57) ABSTRACT

A system is disclosed. The system includes a first optical transceiver having a first set of transmitters and a first set of receivers and a second optical transceiver having a second set of transmitters coupled anti-symmetrically to the first set of receivers of the first optical transceiver and a second set of receivers coupled anti-symmetrically to the first set of transmitters of the first optical transceiver.

8 Claims, 3 Drawing Sheets

BI-DIRECTIONAL PARALLEL OPTICAL LINK

FIELD OF THE INVENTION

The present invention relates to fiber optic communications; more particularly, the present invention relates to spectrally combining and dividing fiber optic signals and arranging optical transmitters and receivers for bi-directional communication.

BACKGROUND

In the future, optical input/output (I/O) will be used in computer systems to transmit data between system components. Optical I/O is able to attain higher system bandwidth with lower electromagnetic interference than conventional I/O methods. In order to implement optical I/O, radiant energy is coupled to a fiber optic waveguide from an optoelectronic integrated circuit (IC).

Typically, a fiber optic communication link includes a fiber optic transmitting device such as a laser, an optical interconnect link, and a light receiving element such as a photo detector. Currently, there is an increasing objective to increase the bandwidth of optical interconnect links.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment, a mechanism to spectrally combine and divide optical I/O is disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
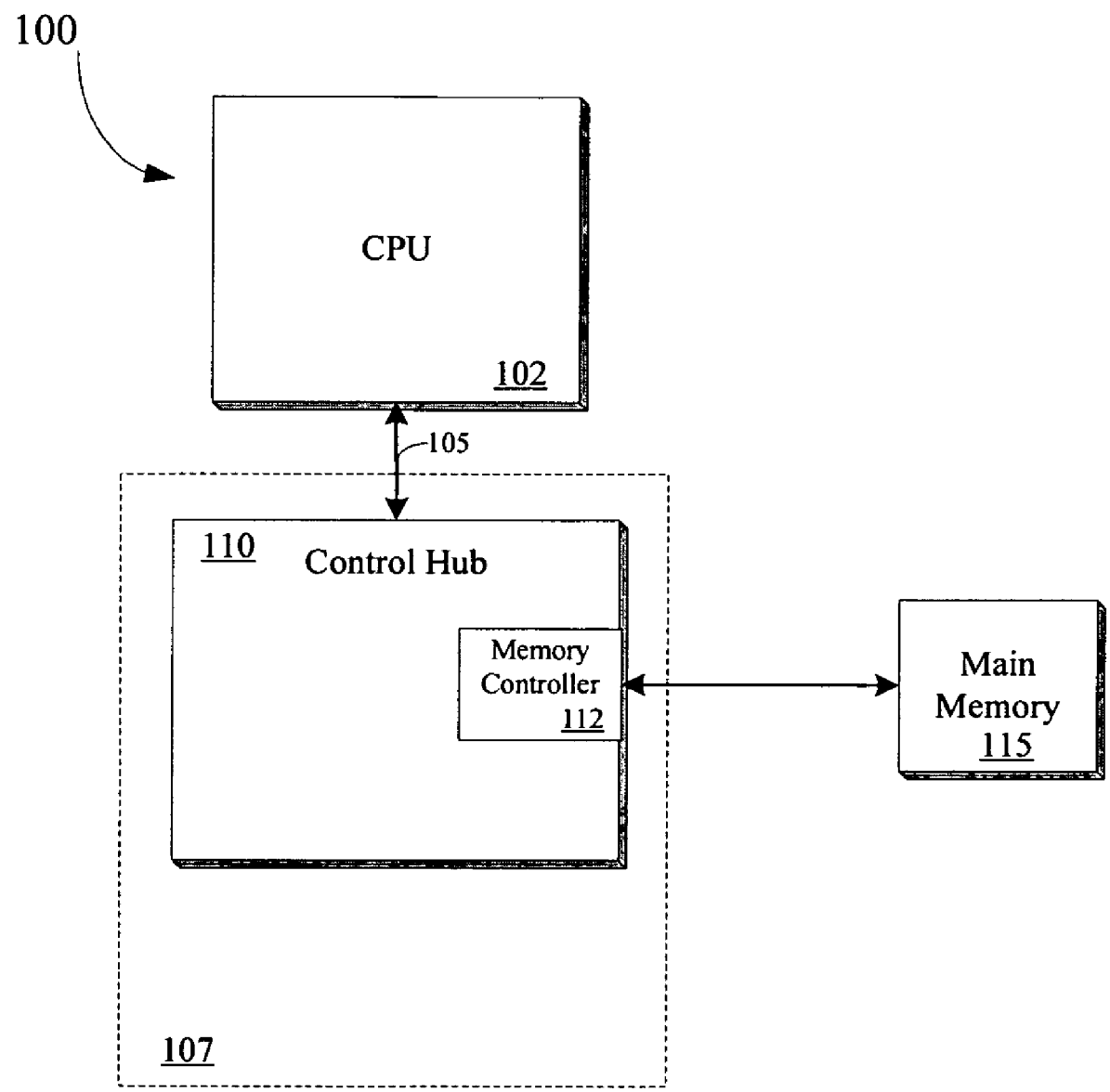
FIG. 1 illustrates one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors including the Pentium® IV processors available from Intel Corporation of Santa Clara, Calif. Alternatively, other CPUs may be used. In a further embodiment, CPU 102 may include multiple processor cores.

According to one embodiment, interface 105 is a front side bus (FSB) that communicates with a control hub 110 component of a chipset 107. Control hub 110 includes a memory controller 112 that is coupled to a main system memory 115. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. According to one embodiment, control hub 110 also provides an interface to input/output (I/O) devices within computer system 100.

Figure 2:
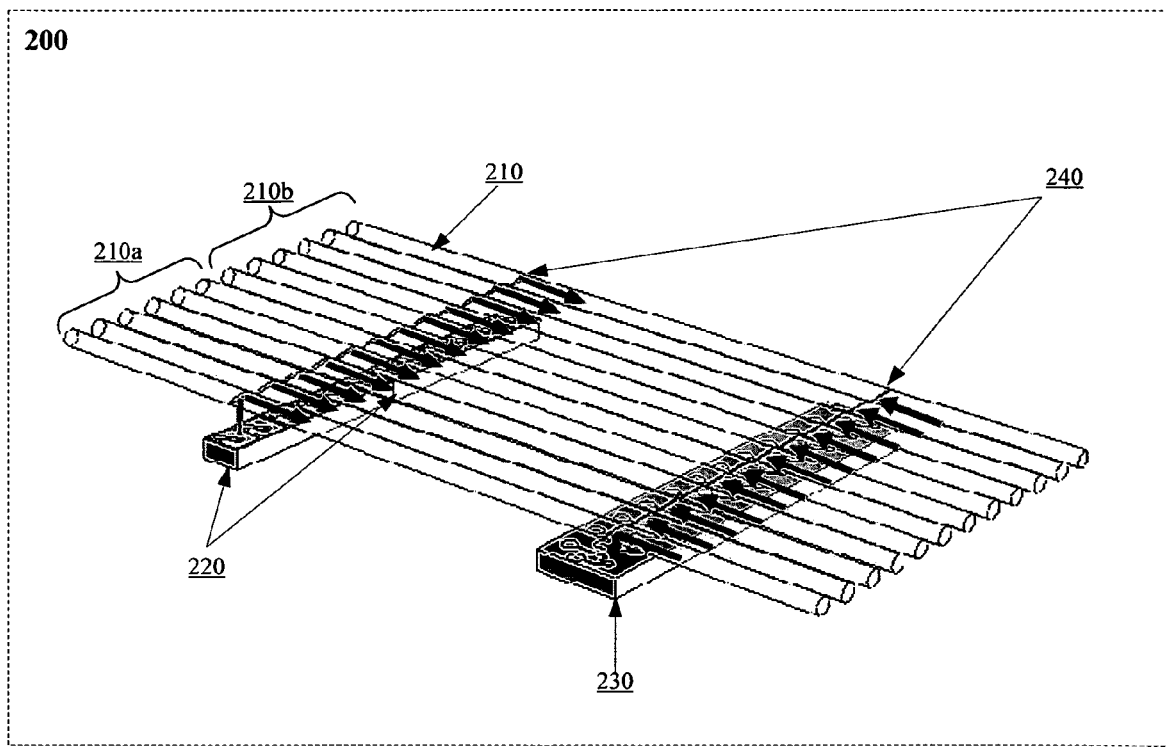
FIG. 2 illustrates one embodiment of an optical assembly.

FIG. 2 illustrates one embodiment of an optical assembly 200. In such an embodiment, optical assembly 200 is implemented to couple optical I/O between components within computer system 100. For instance, optical assembly 200 may couple optical I/O between CPU 102 and control hub 110, and/or control hub 110 and main memory 115. In other embodiments, optical assembly 200 may couple a component within computer system 100 to another computer system.

Referring to FIG. 2, optical assembly 200 includes optical fibers 210, an array of lasers 220, an array of photo detectors 230 and optical filters 240. Optical fibers 210 transfer optical I/O to and from the array of lasers 220 and photo detectors 230. Although described herein using optical fibers, in other embodiments optical fibers may be replaced with plastic waveguides.

In one embodiment, the array of lasers 220 and photo detectors 230 form a single transceiver. In such an embodiment, the transceiver is an anti-symmetric transceiver used to perform bi-directional parallel optic. A parallel optic transceiver is characterized as using one or more fibers for transmission and one or more fibers for reception. Bi-directional refers to each waveguide/fiber transmitting light in both directions.

According to one embodiment, lasers 220 are vertical cavity surface emitting laser (VCSEL) lasers that perform optical to electrical conversions. Photo detectors 230 are PIN photodiodes that transform light into a current.

In one embodiment, the transceiver includes the same number of transmitters as receivers. The number of transmitters or receivers is a multiple of the number of fibers. Further, each fiber has the same number of transmitters and the same number of receivers. According to one embodiment, the minimum number of wavelengths for the transceiver is equal to the number of receivers plus the number of transmitters divided by the number of fibers.

Additionally, on each fiber of the transceiver, the receivers and transmitters are to operate at a different wavelength. The transmitter numbering (channel numbering) is arranged in the opposite way as the numbering of a coupled receiver. Moreover, the path length and number of filters and connectors separating the transmitter from the receiver are identical to provide an effective optical balance between all the channels.

Referring to FIG. 2 as an example, the transceiver includes twelve lasers 220 and twelve photo detectors 230 that process two different wavelengths to perform the bidirectional parallel optic functionality. A first set of six lasers drive optical I/O on to coupled fibers 210a, while a second set of six lasers drive optical I/O on to coupled fibers 210b. Each set of fibers (210a and 210b) transfers two wavelengths ($\lambda_1$ and $\lambda_2$). For example, fibers 210a transfers $\lambda_1$ upstream (e.g., from lasers 220 towards photo detectors 230) and transfers $\lambda_2$ downstream (e.g., from photo detectors 230 towards lasers 220). Similarly, fibers 210b transfers $\lambda_2$ upstream and transfers $\lambda_1$ downstream.

In one embodiment, filters 240 are located near each laser 220 and photo detector 230. Filters 240 are chromatic filters reflect data transferred at one wavelength while allowing data transferred on the other wavelengths to pass. For instance, downstream filters 240 (e.g., filters near photo detectors 230) reflect $\lambda_2$ signals carried on fibers 210a into photo detectors 230, while $\lambda_2$ signals are passed downstream.

Figure 3:
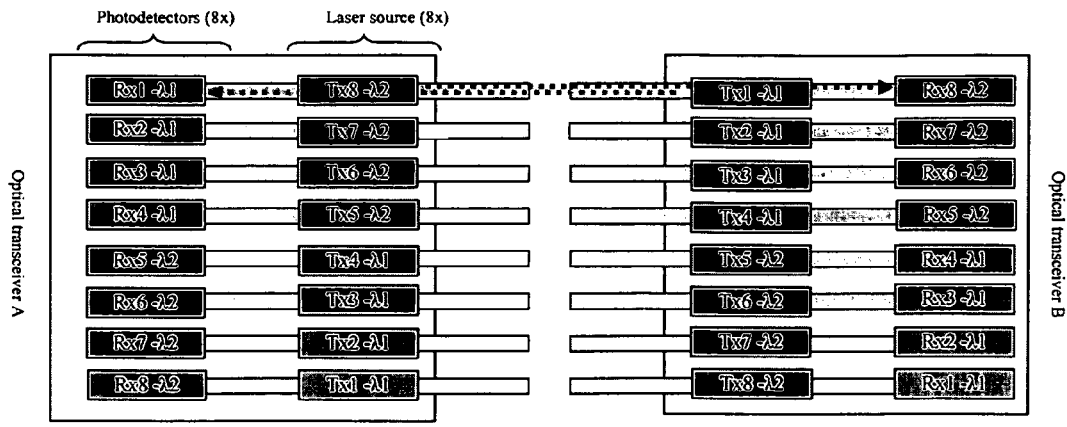
FIG. 3 illustrates one embodiment of a bidirectional parallel optical link.

FIG. 3 illustrates one embodiment of a bidirectional parallel optical link coupling two anti-symmetrical bidirectional parallel optic transceivers. An anti-symmetrical transceiver is a first transceiver (A) that when connected back-to-back to an identical transceiver (B), each individual channel of transceiver A is connected to the corresponding channel of transceiver B. For example, a transmitter#1 of transceiver A is connected to receiver#1 of transceiver B, transmitter#1 of transceiver B is connected to receiver#1 of transceiver A, transmitter#2 of transceiver A is connected to receiver#2 of transceiver B, transmitter#2 of transceiver B is connected to receiver#2 of transceiver A and so forth. In one embodiment, each channel matches channel numbers and the specific wavelength.

As shown in FIG. 3, each transceiver (A or B) includes eight transmitters (Tx1 to Tx8) and eight receivers (Rx1 to Rx8). The transceiver (A or B) also includes eight fibers. Each fiber is connected to one transmitter and one receiver. On the transceiver (A or B), the transmitters are ordered in the opposed way as the receivers.

Of the eight transmitters, four (Tx1 to Tx4) emit light at a wavelength $\lambda_1$, while the other four (Tx5 to Tx8) emit at a wavelength $\lambda_2$. Of the eight receivers, four (Rx1 to Rx4) are sensitive to a wavelength $\lambda_2$ and four (Rx5 to Rx8) are sensitive to a wavelength $\lambda_1$. Therefore on the transceiver (A or B), Tx1 to Tx4 and Rx1 to Rx4 operate at the wavelength $\lambda_1$ and Tx5 to Tx8 and Rx5 to Rx8 operate at the wavelength $\lambda_2$.

By connecting transceiver A back-to-back to transceiver B, Tx1A is connected to Rx1B at a wavelength $\lambda_1$; Tx8B is connected to Rx8A at a wavelength $\lambda_2$; Tx2A is connected to Rx2B at a wavelength $\lambda_1$, . . . , . . . Tx8B is connected to Rx8A at a wavelength $A_2$. The transceiver (A or B) is perfectly anti-symmetric (transmitter/receiver pair and wavelength) and all optical path lengths are equal.

Figure 4:
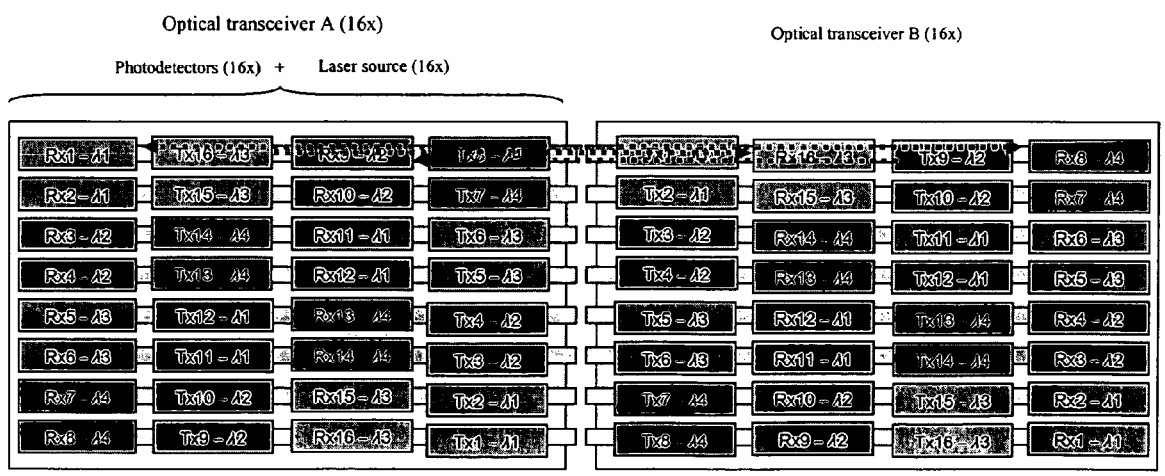
FIG. 4 illustrates another embodiment of a bidirectional parallel optical link.

FIG. 4 illustrates another embodiment of a bi-directional parallel optical link coupling two anti-symmetrical bi-directional parallel optic transceivers. In this embodiment, each transceiver (A or B) is built with sixteen transmitters (Tx1 to Tx16) and sixteen receivers (Rx1 to Rx16). The transceiver (A or B) includes eight fibers. Each fiber is connected to two transmitters and two receivers.

For this transceiver (A or B), the transmitters are ordered in the opposed way as the receivers. Of the sixteen transmitters, four (Tx1, Tx2, Tx11 and Tx12) emit light at a wavelength $\lambda_1$, four others (Tx3, Tx4, Tx9 and Tx10) emit at a wavelength $\lambda_2$, four others (Tx5, Tx6, Tx15 and Tx16) emit at a wavelength $\lambda_3$, and the last four (Tx7, Tx8, Tx13 and Tx4) emit at a wavelength $\lambda_4$.

Of the sixteen receivers, four (Rx1, Rx2, Rx11 and Rx12) are sensitive to a wavelength $\lambda_1$, four (Rx3, Rx4, Rx9 and Rx10) are sensitive to a wavelength $\lambda_2$, four (Rx5, Rx6, Rx15 and Rx16) are sensitive to a wavelength $\lambda_3$, and four others (Rx7, Rx8, Rx13 and Rx14) are sensitive to a wavelength $\lambda_4$. Therefore on this transceiver (A or B), Tx1, Tx2, Tx11, Tx12, Rx1, Rx2, Rx11 and Rx12 work at the wavelength $\lambda_1$, Tx3, Tx4, Tx9, Tx10, Rx3, Rx4, Rx9 and Rx10 work at the wavelength $\lambda_2$, Tx5, Tx6, Tx15, Tx16, Rx5, Rx6, Rx15 and Rx16 work at the wavelength $\lambda_3$, and Tx7, Tx8, Tx13, Tx14, Rx7, Rx8, Rx13 and Rx14 work at the wavelength $\lambda_4$.

By connecting transceiver A back-to-back to transceiver B, Tx1A is connected to Rx1B at a wavelength $\lambda_1$; Tx16B is connected to Rx16A at a wavelength $\lambda_3$; Tx9A is connected to Rx9B at a wavelength $\lambda_2$, . . . , . . . Tx8A is connected to Rx8B at a wavelength $\lambda_4$. The transceiver (A or B) is perfectly anti-symmetric (transmitter/receiver pair and wavelength) and all optical path lengths are equal.

The above-described mechanism enables two transceivers to be optically coupled via a single set of waveguides. As a result, the number of waveguides or fibers in an optical communication link is reduced.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. An optical communications device comprising:
   a first plurality of light transmitters of a first wavelength, coupled to a first plurality of waveguides of an optical data link, respectively;
   a second plurality of light transmitters of a second wavelength different than the first wavelength, coupled to a second plurality of waveguides of the link, respectively, wherein the first and second plurality of light transmitters are to transmit data from one side of the link to another side of the link;
   a first plurality of light detectors of the first wavelength, coupled to the second plurality of waveguides, respectively; and
   a second plurality of light detectors of the second wavelength, coupled to the first plurality of waveguides, respectively, the first and second plurality of light detectors are to receive data in said one side of the link that was transmitted from said another side of the link, wherein the first and second plurality of light transmitters are arranged in a column, and the first and second plurality of light detectors are arranged in a different column.

2. The optical communications device of claim 1 wherein the first and second plurality of light detectors are to receive data for the same data processing element that is to use the link to communicate with another data processing element.

3. The optical communications device of claim 1 wherein channel numbering of the first plurality of light transmitters, that are coupled to the first plurality of waveguides, is arranged in the opposite way as channel numbering of the second plurality of light detectors, that are also coupled to the first plurality of waveguides.

4. The optical communications device of claim 1 wherein the first and second plurality of light transmitters comprise vertical cavity surface lasers.

5. The optical communications device of claim 4 wherein the first and second plurality of light detectors comprise PIN photodiodes.

6. The optical communications device of claim 1 wherein the first and second plurality of light detectors comprise PIN photodiodes.

7. The optical communications device of claim 1 wherein the optical communications device has the same number of first and second plurality of light transmitters as the first and second plurality of light detectors.

8. The optical communications device of claim 1 wherein each of the first and second plurality of waveguides has the same number of transmitters and detectors, from said first and second plurality of light transmitters and first and second plurality of light detectors, coupled to it.

\* \* \* \* \*